(No Model.)

C. J. PHILLIPS.
EXPANSIBLE BOLT FASTENING DEVICE.

No. 445,332. Patented Jan. 27, 1891.

Attest:
A. N. Jesbera.
E. M. Watson.

Inventor:
Cornelius J. Phillips
By David A. Burr
Atty.

UNITED STATES PATENT OFFICE.

CORNELIUS J. PHILLIPS, OF NEW YORK, N. Y.

EXPANSIBLE BOLT-FASTENING DEVICE.

SPECIFICATION forming part of Letters Patent No. 445,332, dated January 27, 1891.

Application filed May 31, 1890. Serial No. 353,724. (No model.)

*To all whom it may concern:*

Be it known that I, CORNELIUS J. PHILLIPS, of the city, county, and State of New York, have invented a new and useful Improvement in Expansion Devices for Fastening Bolts in Marble, Stone, Metal, &c.; and I do hereby declare that the following is a full and exact description thereof, reference being had to the accompanying drawings, and to the letters of reference marked thereon, making a part of this specification.

My invention relates to an improvement in expansion-fastenings for securing bolts and screws to marble or stone work or metal; and it has for its object to simplify, reduce the cost, and increase the efficiency of such fastenings.

My invention consists, substantially as is hereinafter described and claimed, in the combination, with a threaded bolt and with an expansion-collar cylindrical in form, slitted at one end, and fitted loosely upon the bolt, of a sleeve or cylindrical wedge-piece also fitted loosely upon the bolt to engage the entire circumference of the slitted end of the expansion-collar, and of a nut by means whereof the wedge-piece and the expansion-collar are drawn together to produce an expansion of the slitted end of the latter within the aperture or socket in which the fastening has been fitted.

Figure 1:
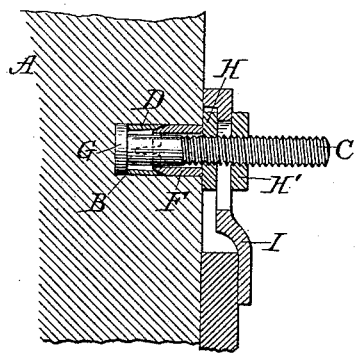
Figure 2:
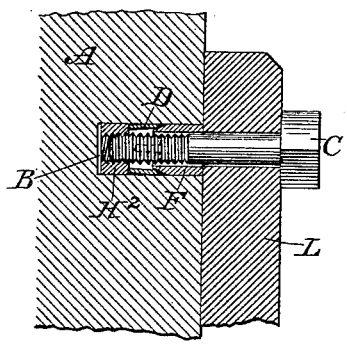
Figure 3:
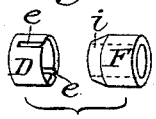

In the accompanying drawings, Figure 1 is a sectional elevation of my improved expansion-fastening fitted within a bolt hole or socket; Fig. 2, a similar view illustrating a modification of the device, and Fig. 3 a view in perspective of the split expansion-collar and of the cylindrical sleeve or wedge-piece to be fitted upon the bolt.

A represents the piece of marble, stone, or metal in the face of which a cylindrical hole or socket B has been drilled to receive the bolt.

C represents the bolt threaded at one end; D, a cylindrical collar of an internal diameter adapting it to fit loosely upon the bolt A, and which is divided at one end by means of longitudinal slits *e e*, (see Fig. 3 and dotted lines, Figs. 1 and 2,) extending nearly its entire length to permit of its radial expansion. The slitted edge of the collar is made to conform substantially with a plane at a right angle with the axis of the collar.

F is a cylindrical sleeve or wedge-piece likewise made to fit loosely upon the bolt. This sleeve is made preferably of a thickness somewhat greater than that of the expansion-collar D, and one end thereof is outwardly beveled to form a conical or wedge-shaped edge *i*, (see Fig. 3,) adapted to enter the split end of the expansion-collar and to bear uniformly against its entire circumference from the inner side thereof.

In the use of my invention, where it is needed to have the threaded end of the bolt C project from the piece A, to which it is made fast, the bolt is formed with a head G, adapted to fit snugly within the bolt-hole B. The expansion-collar D is slipped upon the bolt against said head with its divided end outward, and the wedge-piece F is also fitted upon the bolt with its beveled edge *i* inserted against or under the divided end of said collar to bear against its inner face. A nut H is finally screwed upon the bolt against the outer end of the wedge-piece F, and the bolt C is inserted into the bolt-hole B with its head G at the bottom thereof, as shown in Fig. 1. If now the bolt be held in place and the nut H screwed up against the wedge-piece F, it will force the latter into the divided collar D, and, by reason of the uniform bearing of its beveled edge circumferentially against the inner face of the circular divided edge of the collar and of its wedging action thereon, it will expand and spread said divided edge outwardly uniformly in all directions, so as to cause it to engage the circumscribing wall of the hole B at all points of its circumference and so bind against it as to firmly hold and secure the bolt in place therein. As the segmental divided edges of the outer end of the expansion-collar bear evenly against the wall, they obtain a firm hold or grip thereon throughout their entire length, and as they flare toward the mouth of the bolt-hole any longitudinal strain or tension upon the bolt operates to render the hold thus obtained the stronger. When thus fitted and secured with its threaded end projecting outward, the bolt C may be utilized in the customary manner to hold clamps I, (see Fig. 1,) for securing a wash-basin or other fixture, the clamp being confined upon the bolt by means of a second nut H', or for fastening in like manner any other device to the piece of marble or stone.

Where it is desired to secure an article, as L, (see Fig. 2,) directly upon or against the piece of marble A, the bolt C is passed through the article and fitted first with the sleeve or wedge-piece F, and then with the expansion-collar D, the beveled end of the wedge-piece being placed as before in engagement with the inner face of the divided circular end of the collar, and a nut $H^2$, of a diameter admitting of its insertion into the hole, is screwed partially upon the outer end of the bolt. The bolt with its fittings is then inserted into the hole, so as to carry the nut $H^2$ to the bottom thereof, as shown in Fig. 2, and by pressing the bolt inward the nut may be held while the bolt is turned, so as to cause the nut to draw the expansion-collar toward and upon the beveled ends of the wedge-piece, and thereby cause such an expansion of the collar as will bind it against the wall of the aperture with sufficient force to produce a firm hold and support for the bolt.

It will be observed that my device is reduced to the fewest possible parts—viz., the threaded bolt C, the expansion-collar D, the wedge-piece E, and a nut H or $H^2$; also, that the expansion-collar D is made by reason of the annular wedge at the working end of the cylindrical wedge-piece E to spread uniformly at its circumference, so that its entire circular edge is brought to bear in producing a locking contact with the proximate encircling wall, and, furthermore, that the contacting circular holding-edge of the expansion-collar is inclined outwardly in a direction toward the outer end of the bolt, so that an outward tension upon the bolt will operate as in a toggle-joint to tighten the hold of said edges upon the sides of the hole.

I claim as my invention—

The combination, in an expansion-fastening for bolts, of a threaded bolt or screw, an expansion-collar slitted at one end and having the annular expanding edge of said end in a plane substantially at a right angle with its axis, a cylindrical sleeve having a continuous annular beveled edge adapted to enter and engage the slitted end of the expanding collar, and a nut working upon the bolt, whereby the divided end of the collar is made to expand radially at every point thereof by means of the beveled edge of the sleeve through the action of the screw and nut, substantially in the manner and for the purpose herein set forth.

In testimony whereof I have signed my name to this specification in the presence of two subscribing witnesses.

CORNELIUS J. PHILLIPS.

Witnesses:
A. N. JESBERA,
E. M. WATSON.